E. J. WENDLE.
POWER TRANSMISSION FOR MOTOR VEHICLES.
APPLICATION FILED MAR. 3, 1914.
1,148,879.
Patented Aug. 3, 1915.
3 SHEETS—SHEET 1.
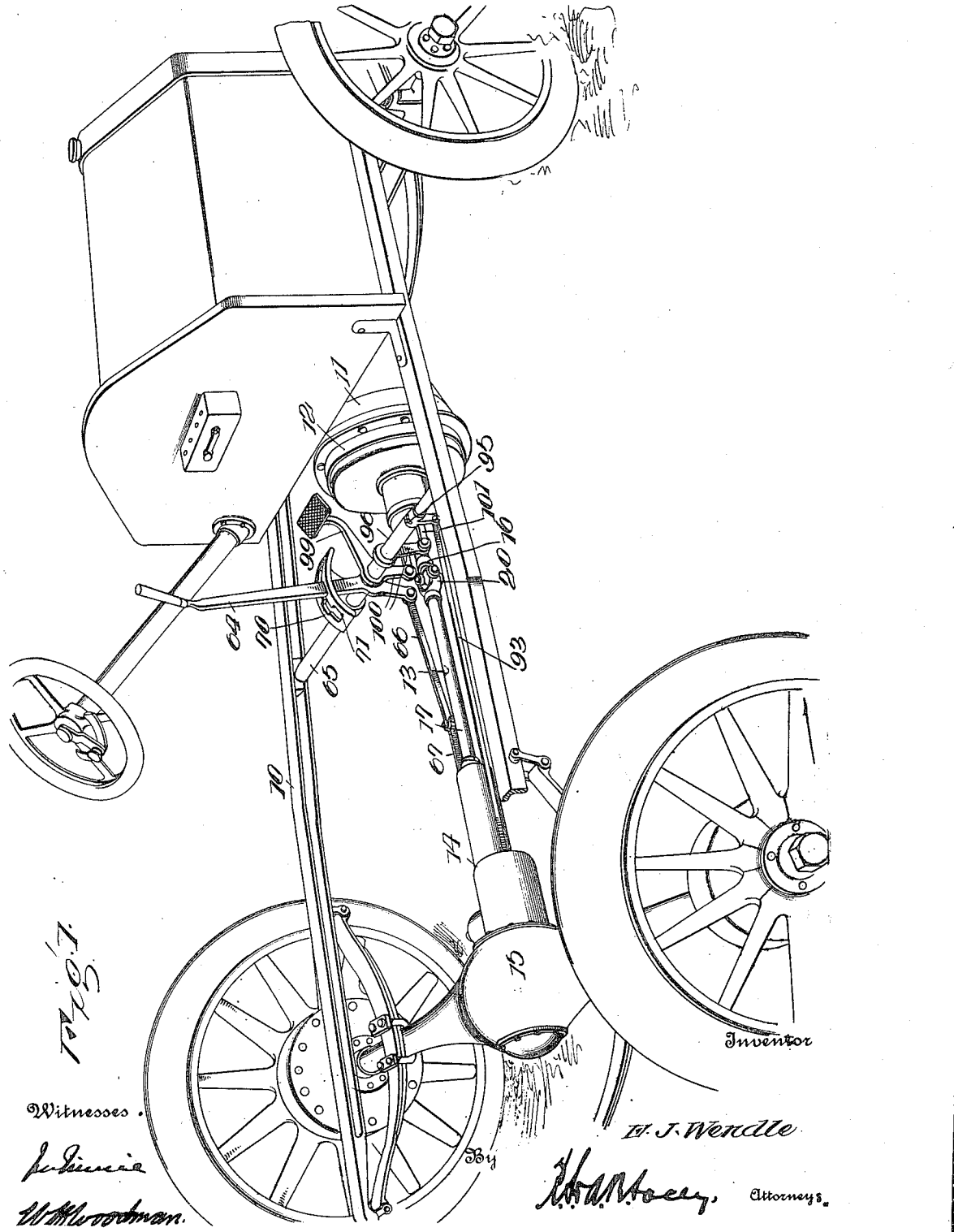

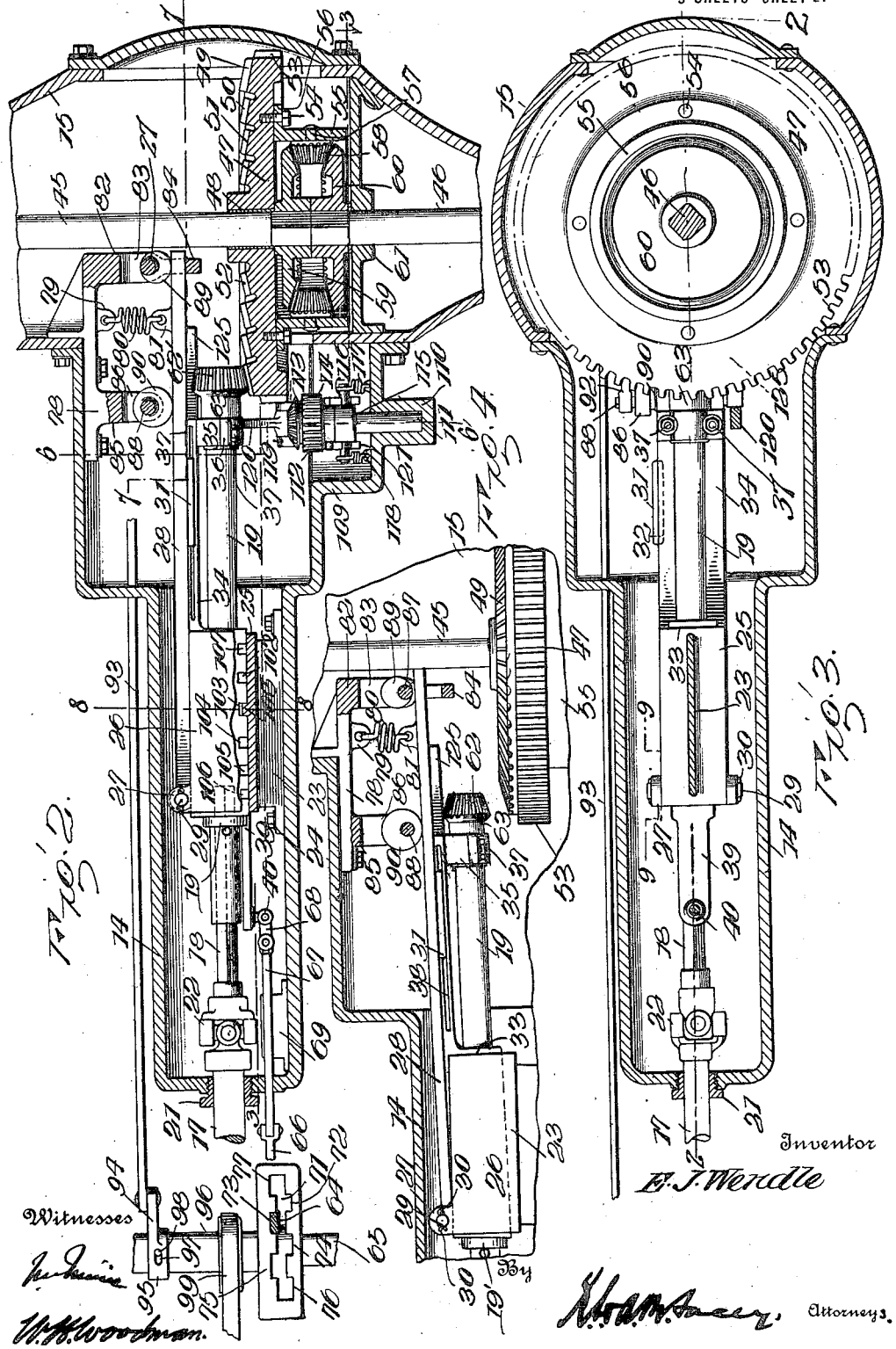

E. J. WENDLE.
POWER TRANSMISSION FOR MOTOR VEHICLES.
APPLICATION FILED MAR. 3, 1914.

1,148,879.

Patented Aug. 3, 1915.
3 SHEETS—SHEET 3.

UNITED STATES PATENT OFFICE.

EDGAR J. WENDLE, OF JOHNSTOWN, PENNSYLVANIA.

POWER TRANSMISSION FOR MOTOR-VEHICLES.

1,148,879. Specification of Letters Patent. Patented Aug. 3, 1915.

Application filed March 3, 1914. Serial No. 822,167.

*To all whom it may concern:*

Be it known that I, EDGAR J. WENDLE, citizen of the United States, residing at Johnstown, in the county of Cambria and State of Pennsylvania, have invented certain new and useful Improvements in Power Transmission for Motor-Vehicles, of which the following is a specification.

My invention relates to new and useful improvements in power transmission mechanisms for self-propelled vehicles, the main object of my invention being the provision of a variable speed power transmission mechanism which will be less complicated in construction and operation and at the same time more efficient and reliable.

My improved power transmission mechanism is of that general type in which the transmission gearing and differential are both incorporated in the rear axle housing while the drive or propeller shaft is inclosed in a torsion tube, the drive shaft being provided with one or more universal joints to compensate for changes in level between the engine and axle.

For this reason, a further object of my invention is the provision of a transmission mechanism in which a single compound multiple gear replaces all the driven gears common to transmission mechanisms, thus economizing in space.

In this connection, a still further object of my invention is the provision of a multiple driven gear mounted for free rotation upon one of the live axle sections, but held against longitudinal movement thereof and constructed to directly carry the cage inclosing the differential gearing.

Another object of my invention is to provide a transmission gearing, of the selective speed type so constructed and arranged that all the speeds for which the gearing is adapted may be obtained by the proper manipulation of a single lever.

A yet further object of my invention is the provision of a lock for the transmission gearing operable by and in conjunction with the clutch and so arranged that the gears are always locked in selected position when the clutch is in active position, this as a result preventing all changing of the transmission gears while the driving shaft is being driven by the engine.

A still further object of my invention consists in the construction of a transmission gearing in which the drive shaft carries a single gear capable of being selectively brought into mesh with one of a number of sets of gear teeth cut upon the multiple gear to obtain the various speed ratios desired, this gear, when reverse drive is wished for, being brought into mesh with a multiple idler gear which in turn is brought into mesh with one of the gears of the first named multiple gear.

A still further object of my invention is the provision of means insuring the proper bringing into mesh of the gear of the driving shaft with the various sets of gears of the multiple gear without undue clashing or strain upon the teeth of any of the gears. In order to accomplish this, I provide means for reciprocating a portion of the driving shaft carrying its gear and also for swinging said portion from one side to the other to move it out of or into mesh with the various sets of gear teeth of the multiple gear carried by the rear axle and its set of gear teeth of the multiple idler gear. With this construction, it will be apparent that that section of the driving shaft carrying the driving gear must be arranged in such a manner that it may be locked both against longitudinal and swinging movement when its gear is in mesh with any one of the sets of gears of the multiple gear.

For this reason, a still further object of my invention is the arrangement of a double locking system employing cams actuatable by movement of the clutch lever to active position and employing a spring or other means for automatically swinging said section of the driving shaft to move its gear out of mesh with the multiple gear upon release of the cams through throwing out of the clutch.

It is a well known fact that one of the chief disadvantages of the center control systems now so commonly in use is the obstruction offered to any transverse swinging of the gear shifting lever by the occupants of the vehicle.

For this reason, a still further object of my invention is the provision of a transmission gearing controllable by a single lever, the sole movement of which is a swinging movement longitudinally of the car, no lateral movement whatever being required. In this connection it should be noted that the construction is such that in changing from higher to lower gears, the gear shifting lever is drawn toward the operator and never moved away from him, this movement being much more natural and the shifting of the gears therefore being greatly facilitated, as shifting to lower gears is more difficult than to higher.

While the above are the chief objects which I have in view, many minor objects, such as the provision of a transmission gearing in which the idler gear, through which the reverse drive takes place, is the only sliding gear and in which said idler gear is in mesh with the gear with which it has sliding engagement before being engaged by the driving gear, thereby providing a positive and silent engagement of the various gears and such as the provision of a construction in which the thrust is taken up by the bearings of the housing rather than by the gears, will appear during more detailed description of my invention.

With these and other objects in view, my invention will be more fully described, illustrated in the accompanying drawings, and then specifically pointed out in the claims which are attached to and form a part of this application.

In the drawings: Figure 1 is a perspective view of a chassis, showing my improved power transmission in place; Fig. 2 is a longitudinal sectional view taken on the line 2—2 of Fig. 3, showing the gears in low speed position; Fig. 3 is a longitudinal sectional view taken on the line 3—3 of Fig. 2; Fig. 4 is a fragmentary sectional view corresponding to that shown in Fig. 2, but illustrating the manner in which the gear carried by the driving shaft is swung laterally out of engagement with the multiple gear carried by the live axle section; Fig. 5 is a fragmentary sectional view taken on the same line as Fig. 2, illustrating the position of the gears for reverse drive; Fig. 6 is a transverse sectional view taken on the line 6—6 of Fig. 2; Fig. 7 is a fragmentary longitudinal sectional view taken on the line 7—7 of Fig. 2, looking in the direction of the arrows; Fig. 8 is a detail sectional view taken on the line 8—8 of Fig. 2; Fig. 9 is a detail sectional view taken on the line 9—9 of Fig. 3.

Corresponding and like parts are referred to in the following description and indicated in all the views of the drawings by the same reference characters.

In Fig. 1 I have illustrated my improved power transmission in connection with the chassis or frame 10 of a conventional form of motor car having a fly wheel 11 carried by the rear end of the crank shaft of the engine, not shown, and to which is operatively connected through the medium of a clutch 12, one end of a driving shaft indicated as a whole by the numeral 13, the opposite end of which extends through a torsion housing 14 forming a forward extension of the rear axle casing or housing 15. The driving shaft consists of four sections 16, 17, 18 and 19, the sections 16 and 17 being connected by a universal joint 20 located adjacent the clutch 12 and the section 17 extending through a stuffing box 21 in the forward end of the torsion housing 14 and being connected to the section 18 by a second universal joint 22. The shaft section 18 is angular in cross section, being preferably square, for engagement in a correspondingly shaped socket formed in the forward end of the shaft section 19, this construction being clearly disclosed in Fig. 2. From this construction it will be apparent that the rear section 19 of the driving shaft 13, because of its squared socket engagement with the squared shaft section 18, will, when the clutch is in active position, be positively rotated while at the same time it is free for reciprocal and transverse swinging movements without becoming disconnected from the shaft section 18.

In order to support the driving shaft section 19, and yet leave it free for longitudinal and swinging movement, I provide a bracket, indicated as a whole by the numeral 23 which is secured to one side of the torsion housing 14 by bolts 24. This bracket is formed with a vertically disposed side wall 25 and spaced, horizontally disposed, upper and lower walls 26 having perforated ears 27 extending from the forward portions of their free edges. These walls form three sides of a square housing, the fourth side of which is formed by a vertically disposed, longitudinally extending plate 28 pivoted at its forward end between the ears 27 by a pivot pin 29 secured by cotter pins 30, the plate being slotted at 29' to receive the pin 29. This plate projects rearwardly to a point considerably beyond the free end of the shaft section 19 and intermediate its length is formed at its upper and lower edges with shoulders 31 directed inwardly toward the shaft and terminating in guide ribs 32 directed toward each other and spaced from the inner face of the plate.

The housing formed by the walls of the bracket 23 and plate 28 inclose a bearing block 33 which is bored to revolubly receive the shaft section 19 and which has a rearward extension 34 terminating adjacent the end of the shaft section in a half bearing 35 which, with a cap bearing 36 secured by bolts 37, forms a journal or bearing for the end portion of the shaft. The upper and lower edges of the extension 34 of this bearing block are grooved or channeled as shown at 38 to slidably receive the guide ribs 32 carried by the swinging plate 28 for which reason swinging of this plate, in a manner which will be later explained, causes swinging of the bearing block and shaft section 19. The bearing block 33, save for disengageable locking means between it and its housing, which locking means will be later described, is free to slide forwardly and rearwardly through the housing but cannot revolve therein. The shaft section 19, while free to rotate in the bearing block, is held against longitudinal movement independent of the block by any suitable means such as the collar 19'. At its forward end and at that side opposite the extension 34, the bearing block 33 is provided with a forward extension 39 carrying an eye 40, the purpose of which will be later explained in connection with the operating mechanism of the transmission gearing. If deemed advisable, additional bearings may be carried by the extension 38 of the bearing block 33 to yet more fully journal the shaft section 19. This, however, will, under ordinary circumstances, be unnecessary.

The rear axle casing or housing 15 incloses the live sections 45 and 46 of the rear axle, the former of said sections being slightly longer than the latter to position the differential gearing, which will be later described, at one side of the transmission gearing which must, of necessity, be in alinement with the driving shaft 13. The axle section 45 carries a multiple gear, indicated as a whole by the numeral 47, this gear being rotatably mounted upon the axle section 45 adjacent its inner end, a bushing 48 being preferably interposed between the axle section and multiple gear to prevent undue wearing of the parts. That face of the multiple gear 47 directed toward the outer end of the axle section 45 is cut to provide a plurality of series of teeth forming concentric beveled gears 49, 50, 51 and 52, these beveled gears being so cut that all of the teeth of all of the gears lie in a common plane at right angles to the axle section 45. The peripheral edge of the multiple gear 47 is also cut to provide a spur gear 53. Secured to the opposite face of the multiple gear 47, by bolts 54, is a cylindrical cage 55 for the reception of the gears of the differential gearing, the bolts 54 being passed through an outwardly directed annular flange 56 of the cage. A plurality of stub shafts 57 extend inwardly and radially from the cage 55 and carry small beveled pinions 58, each of which meshes with both of the beveled gears 59 and 60 mounted upon the abutting ends of the live axle sections 45 and 46.

As clearly shown in Fig. 2 of the drawings, the ends of the axle sections are squared to lock the beveled gears 59 and 60 against rotation independent of the axle sections and also to prevent movement of either of such gears toward the outer end of its axle section, movement in the opposite direction being prevented by engagement with the beveled pinions 58. For this reason, the multiple gear 47 is locked against movement toward the outer end of its axle section and also against movement toward the other axle section. If desired, a bearing forming bracket 61 may be extended across the axle housing 15 to assist in supporting the axle section 46 and to also form a closure for the cage of the differential gearing.

As fully shown in the drawings, the multiple gear 47 is so located upon its axle section 45 that when the rear drive shaft section 19 is extended rearwardly and swung to seat its bearing block against the vertically disposed wall 25 of its housing, a beveled gear 62, mounted upon the end of said axle section, will mesh with one or the other of the gears 49, 50, 51 and 52. This beveled gear 62 is preferably formed with a socket 63 which fits over the free end of the shaft section 19 and bears against the bearing 36, thereby locking the axle section 19 against forward movement. The gear 62 may be keyed, pinned or otherwise secured against any movement independent of the shaft section 19.

From the foregoing description it will be apparent that, assuming the gears are in the position shown in Fig. 2, by swinging the shaft section 19 away from the multiple gear 47, then moving it rearwardly and then swinging it toward the multiple gear 47, the beveled gear 62 may be successively brought into mesh with the beveled gears 49, 50, 51 and 52 of the multiple gear or selectively brought into mesh with any one of these gears. In order to accomplish these gear changes and to render the transmission gearing effective, when the gear 62 is in mesh with any of the gears of the multiple gear, it is necessary to provide means for reciprocating the shaft section 19 either forwardly or rearwardly, for swinging said shaft section toward and away from the multiple gear, and for locking the shaft section against either longitudinal or swinging movement when brought into mesh with any one of the selected gears.

In order to reciprocate the driving shaft section 19 and consequently its beveled gear 62, I provide a hand operated, gear shifting lever 64 which is mounted for swinging movement in a vertical plane upon a shaft 65 extending transversely of the car frame at a point slightly in advance of the driver's seat. The lower end of this lever projects below the shaft and is pivotally connected to one end of a link 66, the opposite end of which is pivotally connected to an operating rod 67 slidably mounted through an opening formed in the forward end of the torsion housing. A relatively short link 68 pivotally connects the rear end of this rod with the eye 40, the intermediate portion of the rod being preferably additionally supported by a guide 69 mounted within the torsion housing. The upper or free end of the hand lever 64 extends through a slotted lever plate 70 preferably supported in any suitable manner upon the shaft 65 and held against any movement. This lever plate, which is preferably curved longitudinally, is provided throughout the greater part of its length with a slot 71 of sufficient width to permit the passage of the lever 64 and at spaced intervals with oppositely disposed offsets or seats 72, 73, 74, 75, 76 and 77 which serve as means for indicating the extent to which the lever must be swung to bring the gear 62 into mesh with any selected one of the gears of the multiple gear 47. These seats may, however, be omitted without in any way affecting the operativeness of the structure, they merely being provided for the convenience of the operator.

As will be readily appreciated from the foregoing description of the hand lever and its connection to the extension 39 of the bearing block 33, any swinging of the hand lever will cause a consequent reciprocation of the bearing block and consequent movement of the shaft section 19, the seats 73, 74, 75 and 76 indicating the positions which must be occupied by the hand lever in order to have the gear 62 in mesh with the gears 49, 50, 51 and 52, respectively.

In order to provide means for laterally swinging the shaft section 19 toward and away from the multiple gear 47, I mount a bracket, indicated as a whole by the numeral 78, in the housing of the transmission gearing, this bracket being provided with an eye 79 which receives one end of a helical spring 80, the opposite end of which is inserted in an eye 81 formed upon the outer face of the plate 28 and adjacent the rear end thereof. This spring is so proportioned as to normally swing the plate 28 and consequently the bearing block 33 and shaft section 19 outwardly to bring the beveled gear 62 out of mesh with any of the gears of the multiple gear 47. The bracket at the rear end is provided with an inwardly directed extension 82 having spaced upper and lower arms 83 connected at their inner ends by a stop bar 84, the arms being so arranged that when the gear 62 is in mesh with any of the beveled gears of the multiple gear 47, the free end of the plate 28 will engage against the stop bar 84. The forward end of the bracket is provided with a similar extension 85 having spaced upper and lower arms 86, the free ends of which are, however, not connected. A vertical shaft 87 is journaled in the arms 83, while a similar shaft 88 is journaled in the arms 86, these shafts carrying eccentrics 89 and 90, respectively, and being squared at their upper ends to receive crank arms 91 and 92, respectively. The eccentrics are so proportioned that in one extreme position of their movement they will hold the plate 28 against the stop bar 84 and consequently hold the gear 62 in mesh with whichever one of the beveled gears of the multiple gear 47 it is in transverse alinement with, and in their other extreme position permit the spring 80 to draw the plate 28 outwardly a sufficient distance to swing the gear 62 out of mesh with any of the gears of the multiple gear 47. In order to provide means for rotating these eccentrics to properly swing the driving shaft section 19, I provide a connecting rod 93 which is connected to both of the crank arms 91 and 92 and at its forward end to an arm 94 carried by a collar 95 which is loosely mounted about a sleeve 96 carried by the shaft 65. This collar is provided with a peripheral slot 97 through which a pin 98 carried by the sleeve 96 extends, this limiting the amount to which the sleeve 96 may be turned without turning the collar 94 and consequently without reciprocating the rod 93 to turn the eccentrics. The clutch pedal 99 is fixedly secured to the sleeve 96 in such a manner that swinging of the clutch pedal will turn the sleeve and the sleeve is provided with hanger arms 100 connected by links 101 to the movable part of the clutch 12.

The above described parts, particularly the slot 97 and links 101, are so proportioned that the movable clutch member may be operated by swinging of the clutch pedal 99 to completely throw out the clutch before any movement is transmitted to the connecting rod 93. At the same time, the clutch and clutch pedal are so arranged that sufficient further movement of the clutch pedal 99 is permitted to insure a half rotation of the eccentrics to free the plate 28, when desired. That face of the bearing block 33 which, when the shaft 19 is locked with its beveled gear in mesh with one of the gears of the multiple gear 47, bears against the inner face of the vertical wall 25 of its housing is provided with a plurality of spaced recesses or seats 102, 103, 104, 105, 106 and 107, any one of which is adapted to receive a locking lug 108 formed upon the inner face of the vertical wall 25 of the housing when the bearing block is swung to the position shown in Fig. 2, the seat in which the lug will engage being dependent upon which one of the gears of the multiple gear the beveled gear 62 is in mesh with. In other words, the seats 103, 104, 105 and 106 will serve, in connection with the lug, to lock the beveled gear 62 in mesh with the gears 49, 50, 51 and 52, respectively, of the multiple gear. In order to provide for a reverse drive, I form the torsion housing 14 with a lateral extension 109 providing a bearing 110 for a stub shaft 111 which extends parallel to the rear axle and which, at its inner end, carries a multiple gear 112 including a beveled gear 113 and a spur gear or pinion 114. This multiple gear 112 is so proportioned, and the stub shaft 111 so mounted that when the driving shaft section 19 is advanced to the position shown in Fig. 5 and the shaft 111 moved inwardly to slide the pinion 114 into mesh with the spur gear 53 of the multiple gear 47, the beveled gear 113 will mesh with the beveled gear 62 of the driving shaft, lying in the same plane with the beveled gears of the multiple gear 47. Under these conditions, rotation of the driving shaft will rotate the multiple gear 112 and cause counter-rotation of the driven gear 47 of the transmission mechanism.

As a means for automatically controlling the movement of the stub shaft 111 and its gear 112, I provide the shaft 111 with a collar 115 so mounted upon the shaft as to be held against longitudinal movement, but leaving the shaft free for rotary movement therein. This collar is provided with diametrically extending pins 116, and helical springs 117 are engaged at one end about the pins and at their opposite ends in perforated ears 118 formed upon the wall of the housing extension 109. These springs normally hold the shaft in outward position, as shown in Fig. 2 of the drawings.

A bracket 119 is mounted within the housing 14 and pivoted intermediate its length, and upon this bracket, is an arcuate lever, indicated as a whole by the numeral 120. One end of this lever is forked to provide spaced arms 121 extending one upon either side of the collar 115 and bifurcated or forked as shown at 122 to engage the pins 116 of the collar. The opposite end of this lever terminates in a foot 123 which projects immediately below the extension 34 of the bearing block 33 when the reverse gear is in outward or neutral position, as shown in Figs. 2 and 6 of the drawings.

The outer face of the extension 34, at its free end is mortised to receive a plate 124 provided at its lower edge with a rearwardly and downwardly projecting cam 125 proportioned, during certain forward movement of the bearing block and shaft section 19, to engage the foot 123 of the lever 120, depressing it to force the shaft 111 inwardly against the action of the springs 117 to bring the reverse gear into active position. An oil cup 126 is preferably provided to supply lubricant of any suitable quality to the bearing 110 of the stub shaft 111.

It should be noted that although the gears 49, 50, 51 and 52 of the multiple gear 47, the gear 62 of the driving shaft and the gear 113 of the multiple gear 112, have all been described as beveled gears, they are not in fact true beveled gears in that they are cut in such a manner as to allow sufficient play to permit the meshing of the gear 62 with any one of the other gears above enumerated, which would not be possible if all the gears were true beveled gears.

The operation of the above described transmission mechanism may best be explained by assuming at the start that the gears are in neutral position and the clutch in active position, that is that the parts are as they would be when the driver approached the car. In the neutral position of the gears, the gear shifting lever 64 engages in the seat 72 of the slotted plate 70 and as a consequence, the locking lug 108 engages in the notch or seat 102 of the bearing block 33, the beveled gear 62 being then substantially in alinement with the stub shaft 111 and therefore wholly out of mesh with the multiple gear 47. In this position, the cam 125 is just ready, should the shaft section 19 be further advanced, to engage the lever 120 to move the multiple gear 112 into mesh with the multiple gear 47, the multiple gear 112, however, still occupying the position shown in Fig. 2. The clutch being in active position, the locking cams 89 and 90 also occupy the position shown in Fig. 2. For this reason, any other than rotary movement of the shaft section 19 is prevented. Commencing then with the gears in neutral position, as above explained, the engine is started in the usual manner and the driver throws in the low speed gear by first swinging the clutch pedal to its full extent, then advancing the gear lever to the position shown in Fig. 2 and then releasing the clutch pedal. The throwing out of the clutch swings the cams 89 and 90, permitting the spring 80 to swing the driving shaft section 19 outwardly, this movement disengaging the lug 108 from the seat 102 of the bearing block. The forward swinging of the gear shifting lever 64 then forces the shaft section 19 rearwardly until the beveled gear 62 is in transverse alinement with the beveled gear 49 and the locking lug 108 with the seat 103 of the bearing block. The subsequent throwing in of the clutch counter-rotates the cams 89 and 90 to swing the plate 28 against the action of the spring 80 and consequently to move the shaft section 19 to bring the gear 62 in mesh with the gear 49 and to seat the lug 108 in the recess or seat 103 of the bearing block, thus locking the gears in position. In like manner, the beveled gear 62 may be successively brought into mesh with the beveled gears 50, 51 and 52 as the car gathers headway. It will of course be apparent that the gear 62 may be selectively moved into engagement with any one of the beveled gears of the multiple gear 47, the intermediate gear changes being omitted, merely by proper movement of the hand lever 64. In order to reverse the direction of movement of the vehicle, the clutch is thrown out in the usual manner and the gear lever swung rearwardly to engage in the seat 77 when the clutch is again thrown in. The throwing out of the clutch of course releases the shaft section 19 and permits it to swing its gear out of engagement with whatever gear it may be in mesh with, while the rearward swinging of the hand lever advances the shaft section 19 to the position shown in Fig. 5, simultaneously during the latter part of such movement, moving the stub shaft 111 inwardly to bring its pinion gear 114 into mesh with the gear 53 of the multiple gear 47. The subsequent throwing in of the cutch then swings the shaft section 19 to bring the beveled gear 62 into mesh with the beveled gear 113 when the drive will take place through the multiple gear 112 as an idler. It will therefore be clear that proper manipulation of the hand lever or control lever 64 and clutch will throw the transmission gears into any desired speed, forward or reverse, for which the gearing is adapted. It should be noted that, at all times, when the clutch is in active position, the gears are locked against any changing and the control lever 64 also locked as a consequence. For this reason it is impossible for a driver, through ignorance, to make any change of gears without first releasing the clutch. Although the clutch controls the locking of the transmission gears, it should be borne in mind that the slotted collar connection between the connecting rod which operates the locks and the clutch sleeve, is such as to permit throwing out of the clutch without releasing the locks, if desired, when driving the car through traffic or coasting down a grade.

One of the chief advantages of my transmission mechanism is the fact that, with the exception of the reverse drive, all speeds are obtainable by a direct drive instead of through the medium of idle gears and that all the different drives are obtained by swinging a beveled gear laterally into mesh with another beveled gear, thereby doing away with the difficulties due to sliding gear transmissions.

The entire mechanism is much less complicated than that of power transmissions now in general use, due to the fact that the differential gearing is, in effect, a unit with the rear axle drive and that all the speeds are controlled by the shifting of one control lever.

If desired, the multiple gear 47 may of course be mounted upon one section of a two-part shaft coupled by a differential gearing and the vehicle driven by chains trained over sprocket wheels upon the shaft sections and over other sprocket wheels carried by the rear axle or by the rear drive wheels themselves. This construction is, however, not illustrated as it is common to drive vehicles by chains driven from a transverse two-part drive shaft to the rear axle. In other words, it will be understood that various changes in details of construction may be made and that the transmission mechanism may be somewhat modified to adapt it for use upon vehicles of different types, providing these changes are within the scope of the appended claims, without in the slightest degree departing from the spirit of my invention and that I do not wish in any way to limit myself to the specific details of construction illustrated in the drawings and described in this specification, these drawings being merely a disclosure of a preferred form of my invention.

Having thus described the invention, what is claimed as new is:

1. In a transmission driving mechanism for motor vehicles, a multiple gear, a driving gear mounted for reciprocatory and swinging movement, whereby it may be selectively brought into mesh with any gear of the multiple gear, means including a clutch for transmitting power to the moving gear, a lever means operable by the lever for reciprocating said gear, and means operable by the clutch for swinging the gear to bring it into mesh with the multiple gears.

2. In a transmission driving mechanism for motor vehicles, a multiple gear, a driving gear mounted for reciprocatory and swinging movement, whereby it may be selectively brought into mesh with any gear of the multiple gear, means including a clutch for transmitting power to the moving gear, a lever, means operable by the lever for reciprocating said gear, means operable by the clutch for swinging the gear to bring it into mesh with the multiple gears, and means operable upon release of the clutch for reversely swinging the gear.

3. In a transmission driving mechanism for motor vehicles, a multiple gear, a driving gear mounted for reciprocatory and swinging movement, whereby it may be selectively brought into mesh with any gear of the multiple gear, means including a clutch for transmitting power to the moving gear, a lever, means operable by the lever for reciprocating said gear, means operable by the clutch for swinging the gear to bring it into mesh with the multiple gears, and means operable upon release of the clutch for reversely swinging the gear, said latter means being automatic in its action.

4. In a power transmission mechanism, a multiple gear, a driving gear, means for reciprocating the driving gear to bring it into alinement with any gear of the multiple gear, and means for swinging the driving gear into engagement with such gear of the multiple gear, said means also locking the driving gear against reciprocatory or swinging movement.

5. In a power transmission mechanism, a driving gear mounted for transverse and longitudinal movement, means including a clutch for imparting movement to the gear, means operable upon throwing out of the clutch for swinging the gear transversely in one direction, means operable to move the gear longitudinally, means operable by throwing in of the clutch to reverse the transverse movement of the gear, and a multiple gear having a plurality of gears adapted to be selectively engaged by the driving gear.

6. In a power transmission mechanism, a driving gear, a co-acting multiple gear, means including a clutch for imparting movement to the driving gear, means operable upon throwing in and out of the clutch for swinging the driving gear toward and away from the multiple gear, and means for reciprocating the driving gear.

7. In a transmission driving mechanism for motor vehicles, a multiple driven gear having a plurality of sets of gear teeth, a plate swingingly mounted at one end, a bearing block mounted to reciprocate along the plate, a driving shaft section journaled in the bearing block and adapted to be moved therewith, a driving gear carried by said shaft section and adapted to be selectively brought into mesh with the sets of gears of the multiple gear by reciprocation of the bearing block and swinging of the plate, and means for reciprocating the bearing block and swinging the plate.

8. In a transmission driving mechanism for motor vehicles, a multiple driven gear having a plurality of sets of gear teeth, a plate swingingly mounted at one end, a bearing block mounted to reciprocate along the plate, a driving shaft section journaled in the bearing block and adapted to be moved therewith, a driving gear carried by said shaft section and adapted to be selectively brought into mesh with the sets of gears of the multiple gear by reciprocation of the bearing block and swinging of the plate, means for swinging the plate, and means for reciprocating the bearing block, said means including a control lever, and operative connection between the control lever and bearing block.

9. In a transmission driving mechanism for motor vehicles, a multiple driven gear having a plurality of seats of gear teeth, a plate swingingly mounted at one end, a bearing block mounted to reciprocate along the plate, a driving shaft section journaled in the bearing block and adapted to be moved therewith, a driving gear carried by said shaft section and adapted to be selectively brought into mesh with the sets of gears of the multiple gear by reciprocation of the bearing block and swinging of the plate, means constantly tending to hold the plate in such position as to hold the driving gear out of mesh with the multiple gear, means operable to swing the plate in the opposite direction, and means for reciprocating the bearing block.

10. In a transmission driving mechanism for motor vehicles, a multiple driven gear having a plurality of sets of gear teeth, a plate swingingly mounted at one end, a bearing block mounted to reciprocate along the plate, a driving shaft section journaled in the bearing block and adapted to be moved therewith, a driving gear carried by said shaft section and adapted to be selectively brought into mesh with the sets of gears of the multiple gear by reciprocation of the bearing block and swinging of the plate, means constantly tending to hold the plate in such position as to hold the driving gear out of mesh with the multiple gear, means operable to swing the plate in the opposite direction, said latter means including a cam engaging the plate, and means for reciprocating the bearing block.

11. In a transmission driving mechanism for motor vehicles, a multiple gear having a plurality of concentrically formed sets of gear teeth, a plate mounted at one end for swinging movement to move its opposite end toward and away from the multiple gear, a bearing member mounted for sliding movement longitudinally of the plate and adapted to swing therewith, a driving shaft section journaled in the bearing member and adapted to be moved therewith, means including a clutch for imparting rotary movement to the shaft section, means for reciprocating the bearing member to reciprocate the shaft section, a driving gear mounted on the shaft section, a cam engaging the plate and adapted in one position to swing the plate to bring the driving gear into mesh with one of the gears of the multiple gear, and means operatively connected to the clutch mechanism for swinging said cam to such position.

12. In a transmission driving mechanism for motor vehicles, a multiple gear having a plurality of concentrically formed sets of gear teeth, a plate mounted at one end for swinging movement to move its opposite end toward and away from the multiple gear, a bearing member mounted for sliding movement longitudinally of the plate and adapted to swing therewith, a driving shaft section journaled in the bearing member and adapted to be moved therewith, means including a clutch for imparting rotary movement to the shaft section, means for reciprocating the bearing member to reciprocate the shaft section, a driving gear mounted on the shaft section, a cam engaging the plate and adapted in one position to swing the plate to bring the driving gear into mesh with one of the gears of the multiple gear, and means operatively connected to the clutch mechanism for swinging said cam to such position, said means being so arranged that the clutch may be disengaged before it becomes operative to move the cam.

13. In a transmission driving mechanism for motor vehicles, a multiple gear having a plurality of concentrically formed sets of gear teeth, a plate mounted at one end for swinging movement to move its opposite end toward and away from the multiple gear, a bearing member mounted for sliding movement longitudinally of the plate and adapted to swing therewith, a driving shaft section journaled in the bearing member and adapted to be moved therewith, means including a clutch for imparting rotary movement to the shaft section, means for reciprocating the bearing member to reciprocate the shaft section, a driving gear mounted on the shaft section, a cam engaging the plate and adapted in one position to swing the plate to bring the driving gear into mesh with one of the gears of the multiple gear, means operatively connected to the clutch mechanism for swinging said cam to such position, said means being so arranged that the clutch may be disengaged before it becomes operative to move the cam, and a spring normally tending to hold the plate away from the multiple gear.

14. In a transmission driving mechanism for motor vehicles, a multiple gear having a plurality of sets of gear teeth, a bearing member mounted for longitudinal and swinging movement, a driving shaft section rotatably mounted in the bearing member and adapted to be moved therewith, a gear carried by said section and adapted to mesh with the gears of the multiple gear, means for reciprocating the bearing member, means for swinging the bearing member, and means operable upon swinging of the bearing member to bring the driving gear into mesh with the multiple gear to lock the bearing member against reciprocation.

15. In a transmission driving mechanism for motor vehicles, a multiple gear having a plurality of sets of gear teeth, a bearing member mounted for longitudinal and swinging movement, a driving shaft section rotatably mounted in the bearing member, a gear carried by said section and adapted to mesh with the gears of the multiple gear, means for reciprocating the bearing member, means for swinging the bearing member, and means operable upon swinging of the bearing member to bring the driving gear into mesh with the multiple gear to lock the bearing member against reciprocation, said means including a fixed stop lug adapted to engage any one of a plurality of seats formed in the bearing member.

16. In a transmission driving mechanism for motor vehicles, a multiple gear having a plurality of sets of gear teeth, a bearing member mounted for longitudinal and swinging movement, a driving shaft section rotatably mounted in the bearing member, a gear carried by said section and adapted to mesh with the gears of the multiple gear, means for reciprocating the bearing member, means for swinging the bearing member, means operable upon swinging of the bearing member to bring the driving gear into mesh with the multiple gear to lock the bearing member against reciprocation, and means for locking the bearing member against swinging movement when the driving gear is in mesh with one of the gears of the multiple gear.

17. In a transmission driving mechanism for motor vehicles, a multiple gear having a plurality of concentric sets of beveled gears and a spur gear, an idler multiple gear having a spur gear adapted to mesh with the spur gear of the first multiple gear and a beveled gear, and a driving gear selectively movable to mesh with any one of the beveled gears of the first multiple gear or with the beveled gear of the second multiple gear when the multiple gears are in mesh with each other.

18. In a transmission driving mechanism for motor vehicles, a multiple gear having a plurality of concentric sets of beveled gears and a spur gear, an idler multiple gear having a spur gear adapted to mesh with the spur gear of the first multiple gear and a beveled gear, a driving gear selectively movable to mesh with any one of the beveled gears of the first multiple gear, or with the beveled gear of the second multiple gear when the multiple gears are in mesh with each other, and means operable by the movement of the driving gear into position to mesh with the beveled gear of the second multiple gear for moving said second multiple gear into mesh with the first multiple gear and with the driving gear.

19. In a transmission driving mechanism for motor vehicles, a multiple gear having a plurality of concentric sets of beveled gears and a spur gear, an idler multiple gear having a spur gear adapted to mesh with the spur gear of the first multiple gear and a beveled gear, a driving gear selectively movable to mesh with any one of the beveled gears of the first multiple gear, or with the beveled gear of the second multiple gear when the multiple gears are in mesh with each other, and means operable by the movement of the driving gear into position to mesh with the beveled gear of the second multiple gear for moving said second multiple gear into mesh with the first multiple gear and with the driving gear, said means including a lever engaging the second multiple gear, and a cam member movable with the driving gear and adapted to engage the lever to move the second multiple gear.

20. In a transmission driving mechanism for motor vehicles, a multiple gear having a plurality of concentric sets of beveled gears and a spur gear, an idler multiple gear having a spur gear adapted to mesh with the spur gear of the first multiple gear and a beveled gear, a driving gear selectively movable to mesh with any one of the beveled gears of the first multiple gear or with the beveled gear of the second multiple gear when the multiple gears are in mesh with each other, and means operable by the movement of the driving gear into position to mesh with the beveled gear of the second multiple gear for moving said second multiple gear into mesh with the first multiple gear and with the driving gear, said means including a lever engaging the second multiple gear, a cam member movable with the driving gear and adapted to engage the lever to move the second multiple gear, and means operable upon reverse movement of the driving gear for reversely moving the multiple gear.

21. A transmission driving mechanism for motor vehicles including a multiple gear having a plurality of sets of gears, an idler multiple gear movable to bring one of its gears into mesh with one of the gears of the first multiple gear, and a driving gear movable into mesh with any one of certain of the gears of the first multiple gear or with one of the gears of the idler multiple gear when the latter is in mesh with the first multiple gear.

22. A transmission driving mechanism for motor vehicles including a multiple gear having a plurality of sets of gears, an idler multiple gear movable to bring one of its gears into mesh with one of the gears of the first multiple gear, a driving gear movable into mesh with any one of certain of the gears of the first multiple gear or with one of the gears of the idler multiple gear when the latter is in mesh with the first multiple gear, and means for locking the driving gear when in mesh with any of the above gears.

23. In a transmission driving mechanism for motor vehicles, a multiple gear having a plurality of sets of gears, an idler multiple gear having two sets of gears and movable to bring one of its sets into engagement with one of the sets of gears of the first multiple gear, a driving gear mounted for reciprocatory and swinging movements to bring it into mesh with any one of certain of the gears of the first multiple gear or with one of the gears of the second multiple gear when the latter is in mesh with the first multiple gear, means for locking said driving gear against reciprocatory movement when in mesh with any of said gears, and means for locking the driving gear against swinging movement when in mesh with any of said gears.

24. In a transmission driving mechanism for motor vehicles, a multiple gear having a plurality of sets of gears, an idler multiple gear having two sets of gears and movable to bring one of its sets into engagement with one of the sets of gears of the first multiple gear, a driving gear mounted for reciprocatory and swinging movements to bring it into mesh with any one of certain of the gears of the first multiple gear or with one of the gears of the second multiple gear when the latter is in mesh with the first multiple gear, means for locking said driving gear against reciprocatory movement when in mesh with any of said gears, and means for locking the driving gear against swinging when in mesh with any of said gears, the locking of the driving gear against reciprocatory movement being accomplished by the locking of said gear against swinging movement.

In testimony whereof I affix my signature in presence of two witnesses.

EDGAR J. WENDLE. [L. S.]

Witnesses:
 STANLEY BLOCK,
 JOHN MARTEN.